United States Patent
Greenwood et al.

(10) Patent No.: US 11,023,535 B1
(45) Date of Patent: Jun. 1, 2021

(54) PLACEMENT OF DATA VOLUMES IN A DATA CENTER

(71) Applicant: Amazon Technologies, Inc., Seattle, WA (US)

(72) Inventors: Christopher Magee Greenwood, Seattle, WA (US); Yilin Guo, Seattle, WA (US); Wells Lin, Seattle, WA (US); Mitchell Gannon Flaherty, Seattle, WA (US); Sriram Venugopal, Issaquah, WA (US); Linfeng Yu, Seattle, WA (US); Patrick E. Brennan, Seattle, WA (US); Gary Michael Herndon, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 15/927,782

(22) Filed: Mar. 21, 2018

(51) Int. Cl.
  G06F 15/16 (2006.01)
  G06F 16/907 (2019.01)
  G06F 16/903 (2019.01)

(52) U.S. Cl.
  CPC ...... *G06F 16/907* (2019.01); *G06F 16/90335* (2019.01)

(58) Field of Classification Search
  CPC combination set(s) only.
  See application file for complete search history.

(56) References Cited

U.S. PATENT DOCUMENTS

| | | | |
|---|---|---|---|
| 7,730,034 B1 * | 6/2010 | Deflaux | G06F 16/25 707/654 |
| 9,262,210 B2 * | 2/2016 | Caufield | G06F 9/4843 |
| 2004/0034856 A1 * | 2/2004 | Boudnik | G06F 9/5027 718/103 |

* cited by examiner

*Primary Examiner* — Tuankhanh D Phan
(74) *Attorney, Agent, or Firm* — Klarquist Sparkman, LLP (57) ABSTRACT

A new metadata field is described that can be used with requests to store a volume in a block storage service. The metadata field is a parameter included in the request and is a logical association identifier that associates the volume to be stored with other already-stored volumes. Using this logical association identifier, the block storage service can ensure that all volumes having the same identifier are sufficiently spread across server computers. The logical association identifier can be a workload identifier indicating that the volumes are all from a same relational database, application, etc. Target customers are defined as customers that request an action of a service within a cloud environment and the service then makes a request to the block storage service. In this case, the service is a customer of the block storage service and it can pass the target customer identifier as the logical association identifier.

20 Claims, 8 Drawing Sheets

PLACEMENT OF DATA VOLUMES IN A DATA CENTER

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs. In some cases, virtual machine instances execute under a virtualization layer that exposes a logical volume stored on partitions distributed between data storage servers. However, determining how volume partitions should be distributed to achieve optimal performance, durability, and availability can be challenging, particularly when conditions, constraints, and partition locations can change over time.

DETAILED DESCRIPTION

A new metadata field is described that can be used with requests to store a volume in a block storage service. The metadata field is a parameter included in the request and is a logical association identifier that associates the volume to be stored with other already-stored volumes. Using this logical association identifier, the block storage service can ensure that all volumes having the same identifier are sufficiently spread across server computers. The logical association identifier can be a workload identifier indicating that the volumes are all from a same relational database, application, etc. Target customers are defined as customers that request an action of a service within a service provider environment and the service then makes a request to the block storage service. In this case, the service is a customer of the block storage service and it can pass the target customer identifier as the logical association identifier.

Techniques are described for managing access of executing programs to block data storage. In at least some embodiments, the techniques include providing a block storage service that uses multiple server storage systems to reliably store block data that may be accessed and used over one or more networks by programs executing on other physical computing systems. Users of the block storage service may create one or more storage volumes that each have a specified amount of block storage space, and may initiate use of such a storage volume (also referred to as a "volume" herein) by one or more executing programs, with at least some such volumes having copies stored by two or more of the multiple server storage systems so as to enhance volume reliability and availability to the executing programs.

The block storage service can utilize multiple server computers to store the volumes. A volume is a logical unit of storage and is often analogized to a hard drive. The data stored to the volume is stored in one or more partitions. Each partition associated with the volume may be stored on a physical storage server controlled by the block storage service. In some embodiments, a volume may be associated with one, eight, sixteen, one hundred, etc. partitions stored across a plurality of physical storage devices. When an I/O request to a chunk of the volume, a determination can be made as to which storage device stores the partition having the extent and the request can be routed to that storage device.

In some cases the volumes can divided into any number of partitions, although such a division is not required. The partitions can be stored separately from other partitions in separate storage devices. For example, one volume can be divided into 8 partitions and those partitions can be spread (i.e., stored) across 4 different server computers with 2 partitions per server computer. As described further below, spreading of the volumes across multiple server computers can increase performance. For example, spreading of volumes allows different servers to handle read and/or write requests to the volume in parallel, which increases the performance characteristics of the block storage service, including one or more of the Input/Output Operations Per Second (IOPS), latency and throughput of the block storage service. Most typically, bursts of volume access can occur from an application so that if multiple partitions for that application are stored on the same server computer, efficiency is reduced. Currently, partitions for volumes can be spread across server computers based on a customer identifier, but without regard to a particular workload. More particularly, selection of which portions of a volume are stored on which server computers is a decision undertaken by the block storage service, but without knowledge or regard to what workload the volume is related.

As described further below, an additional parameter can be added to a request to store a volume that signals to the block storage service that this volume to be stored is related to other volumes already stored. In this way, the block storage service has additional information, beyond merely a customer ID, so as to make decisions about how to distribute (i.e., spread) the volumes (and their partitions) across the available server computers.

The request to store the volume can be received from both external and internal customers. External customers are considered to be customers of a compute service provider, generally, but that make requests directly to the block storage service, whereas internal customers are services executing within the compute service provider that can be acting on behalf of external customers or that can be requesting their own block storage for other purposes. When the internal customers are acting on behalf of external customers, then such external customers are called "target" customers. For example, when a relational database service (which is part of a compute service provider) calls the block storage service on behalf of a company A (an external customer of the compute service provider), then company A is considered a so-called target customer.

The additional parameter included in the request is metadata that can be called a "logical association identifier" and is generated or otherwise provided by external or internal customers to the block storage service. This metadata can be used by the block data storage service as an identifier (beyond merely the internal or external customer identifier) to associate data volumes with other data volumes. The logical association identifier can be a workload identifier that indicates that the volume is associated with a same database, application, operating system, service, etc. as other stored volumes. Other logical workloads can include serving up a web site, running a Hadoop node, or any other individual units of work that are tasks associated with a customer identifier.

When the block storage service stores partitions of a volume across different server computers, "spread" is a metric for defining how many different servers the block storage services uses. If a customer has a large number of partitions of a volume on a same server, the spread is poor. Conversely, if a volume has partitions on multiple server computers, then the spread is considered good. The partitions can be a primary partition for a volume or a replica (backup) partition of a volume, and the spreading can be applied equally to both or, conversely, only to one. Spreading of volumes allows different servers to handle read and/or write requests to the volume in parallel, which increases the overall TOPS of the block storage service. The spread can be limited to a network domain, such as a server rack, a spine, or a data center. In the case of a server rack, then only servers within that server rack are selected for placement, for example. Another simple example is as follows:

Assume that a customer has 6 volumes on 4 servers and the volumes are divided amongst servers S1-S4 as shown below:

S1 (V1)
S2 (V2)
S3 (V3, V4)
S4 (V5, V6)

If a target customer request requires 2 volumes (V7, V8), previous placement algorithms would place the new volumes on S1 and S2 so as to equally divide the volumes. But if the logical association identifier indicates that the two new volumes V7, V8 are associated with V1 and V2, and not associated with V3-V6, then the block storage service would store the new volumes on S3 and S4. Thus, relative to a workload, volumes V1, V2, V7 and V8 have maximum spread, despite that the customer spread has the volumes unequally spread. Thus, the block storage service can check whether any volumes have the same identifier as the volumes to be stored and can ensure that all related volumes are spread across different server computers. Spreading algorithms can include a conditional limit on the number of volumes sent to any server within a given time or, explicitly, by only allowing a given number of logical association identifiers on any server.

Using the logical association identifier as metadata included in requests to store volumes, a customer or target customer can control how volumes are stored across servers by the block storage service for different tasks or workloads of the customer. In this way, the overall efficiency of storage and access to volumes is increased. For example, by allowing different volumes to be stored on different server computers that are associated with a same workload, then any bursts for data associated with that workload will have a higher capacity throughput and a higher level of IOPS. In another example, the block storage service can use the extra metadata to ensure heads nodes for given common cluster spin-ups move to different server computers. For example, for Spark or Hadoop, the block storage service can ensure that head nodes are on different servers or network infrastructure to improve durability and availability and to reduce a possibility of entire cluster failure.

Figure 1:
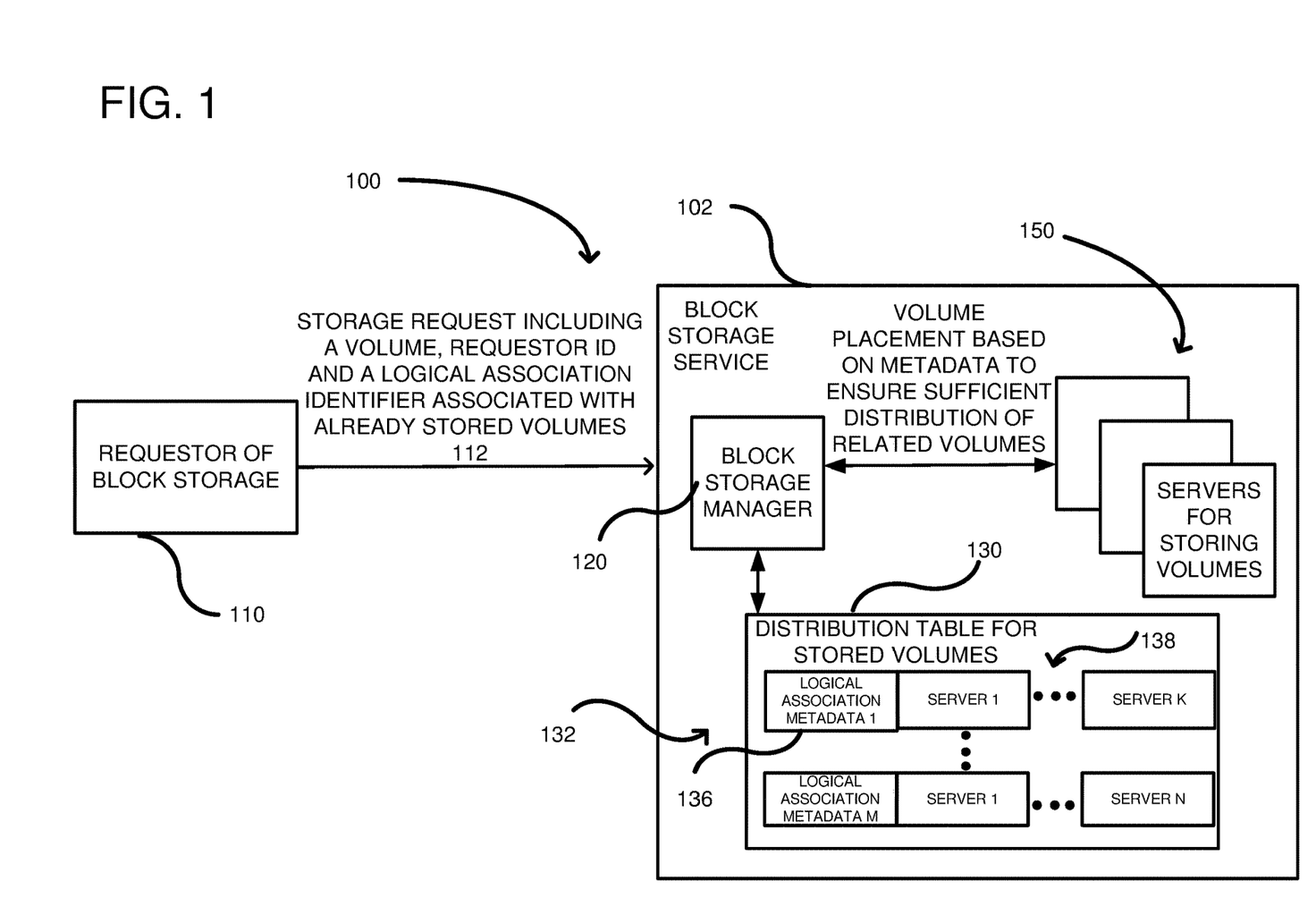
FIG. 1 is a system diagram of a block storage service used for placing volumes on server computers in response to external requests.

FIG. 1 is a system 100 including a block storage service 102 used for placing volumes in a distributed fashion based on metadata supplied from a requestor 110. An example request 112 is made from the requestor 110 and includes a volume, a requestor ID, and a logical association identifier used to associate the volume with already stored volumes on the block storage service. In one example, the block storage service 102 is in a public service provider environment that offers compute and storage services to customers. Generally, a service is a software function provided at a network address over the web or the cloud. Clients initiate service requests and servers process the requests and return appropriate responses. The client service requests are typically initiated using, for example, an API request. For purposes of simplicity, service requests will be generally described below as API requests, but it is understood that other service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

When the request 112 is received by the block storage service 102, a block storage manager 120 parses the request and uses the logical association identifier in order to search a distribution table 130. The distribution table 130 includes a plurality of entries 132. Each entry includes numerous fields including a logical association identifier field, such as is shown at 136, and associated server computer fields, such as is shown at 138. The distribution metadata 136 can be a numeric or alphanumeric string such as a globally unique identifier (GU ID). The server computer fields 138 are identifiers, such as addresses, of server computers having the same distribution metadata as was received in the request 112. Each entry 132 can include a different number of server computers in their respective fields. For example, the first entry shows K fields of server computers (where K is any integer value) and the last entry shows N fields of server computers (where N is any integer value and can be different from K). Each time a new request 112 is received, the block storage manager searches the distribution table 130 in order to find associated servers that store volumes related to the volume to be stored according to the request 112. The block storage manager 120 can then use the identifiers associated with those servers as input into a placement algorithm in order to determine which server computer to store the new volume. The block storage service includes a plurality of server computers 150 having differing levels of availability. For example, some of the servers 150 already have partitions for volumes placed thereon in accordance with the distribution table 130. In order to determine which server(s) computer amongst the group 150 should be used to place partitions for the new volume, the block storage manager 120 uses metrics associated with availability of the server computers and metrics associated with the servers having associated volumes with the new volume. In terms of weighting, the block storage manager will heavily weigh in favor of not storing the new volume on a same server computer having a volume with the same logical association identifier. Thus, using the weighting algorithm, the new volume is placed on a server computer that is sufficiently dispersed from the other associated volumes.

The logical association identifier can provide information, other than customer identity, describing an association between different volumes. A common association can, for example, be that the volumes are from a same logical database. Other associations can also be used, such as being from a same application, workload, etc. The logical association identifier allows the requestor to have some control over the distribution model used by the block storage manager 120. For example, a customer can choose which volumes to associate with a new volume to be stored. And such an association can change how the block storage service places the partitions for the new volume. It is the customer who has more knowledge about potential bursts of data requests that can occur due to the nature of the application and by using the logical association identifier, the customer can provide additional information to the block storage manager for purposes of placement of new volumes.

Figure 2:
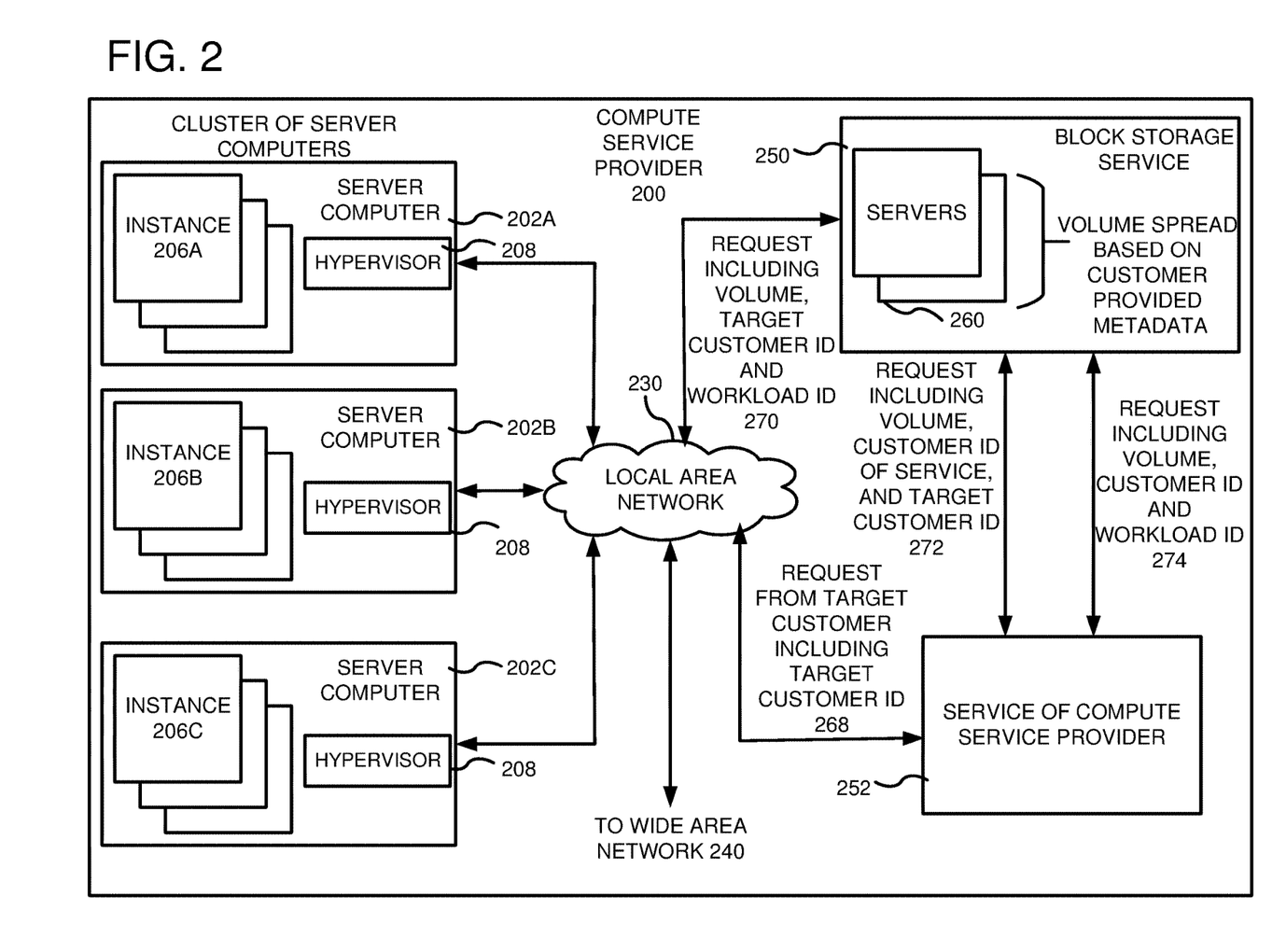
FIG. 2 is an example system diagram showing a plurality of virtual machine instances running in the multi-tenant environment with a block storage service receiving requests from target customers and from other services within the multi-tenant environment.

FIG. 2 is a computing system diagram of a network-based compute service provider 200 that illustrates one environment in which embodiments described herein can be used. By way of background, the compute service provider 200 (i.e., the cloud provider) is capable of delivery of computing and storage capacity as a service to a community of end recipients. In an example embodiment, the compute service provider can be established for an organization by or on behalf of the organization. That is, the compute service provider 200 may offer a "private cloud environment." In another embodiment, the compute service provider 200 supports a multi-tenant environment, wherein a plurality of customers operate independently (i.e., a public cloud environment). Generally speaking, the compute service provider 200 can provide the following models: Infrastructure as a Service ("IaaS"), Platform as a Service ("PaaS"), and/or Software as a Service ("SaaS"). Other models can be provided. For the IaaS model, the compute service provider 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 200 using networked client devices, such as desktop computers, laptops, tablets, smartphones, etc. running web browsers or other lightweight client applications. Those skilled in the art will recognize that the compute service provider 200 can be described as a "cloud" environment.

The particular illustrated compute service provider 200 includes a plurality of server computers 202A-202C. While only three server computers are shown, any number can be used, and large centers can include thousands of server computers. The server computers 202A-202C can provide computing resources for executing software instances 206A-206C. In one embodiment, the instances 206A-206C are virtual machines. As known in the art, a virtual machine is an instance of a software implementation of a machine (i.e. a computer) that executes applications like a physical machine. In the example of virtual machine, each of the servers 202A-202C can be configured to execute a hypervisor 208 or another type of program configured to enable the execution of multiple instances 206 on a single server. Additionally, each of the instances 206 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

A network 230 can be utilized to interconnect the server computers 202A-202C and other services in the compute service provider. The network 230 can be a local area network (LAN) and can be connected to a Wide Area Network (WAN) 240 so that end users can access the compute service provider 200. It should be appreciated that the network topology illustrated in FIG. 2 has been simplified and that many more networks and networking devices can be utilized to interconnect the various computing systems disclosed herein.

The compute service provider 200 can offer a plurality of services to its customers such as a block storage service 250 and other services 252, which can the use the block storage service 250 store volumes of data. Example services 252 can include a relational database service, a load bouncing service, etc. Consequently, requests to store volumes on the block storage service 250 can be initiated from customers associated with the instances 206 (i.e., target customers) or from services, such as service 252. As shown at 270, a request to the block storage service 250 can be received from the target customer executing applications on any of the server computers 202. Such a request, would include a volume, the target customer ID as well as a customer-selected workload ID (which is a particular example of the logical association identifier). The target customer can also send requests 268 to the service 252. In turn, the service 252 can send a request 272 to the block storage service 250. The request 272 includes the volume, the customer ID associated with the service 252 and the target customer ID received in the request 268. In such a case, the extra metadata associated with the request 272 is the target customer ID. Thus, the block storage service 250 can spread the volumes sent by the customer 252 based on the target customer ID. The service 252 can also choose to spread volumes using a workload ID as indicated in the request 274. In that case, the request 274 includes the volume to be stored, the customer ID (associated with the service 252) and the workload ID.

Thus, whether the customer is a service 252 of the compute service provider 200 or a customer of the compute service provider, additional metadata can be included in the request to store volumes in a block storage service 250, wherein the metadata logically associates the volume that is requested to be stored with other volumes already stored by the block storage service. Unlike the customer ID which needs to be submitted with the request, the additional metadata is provided by the customer so that the customer has some control over how the block storage service stores the volume.

Figure 3:
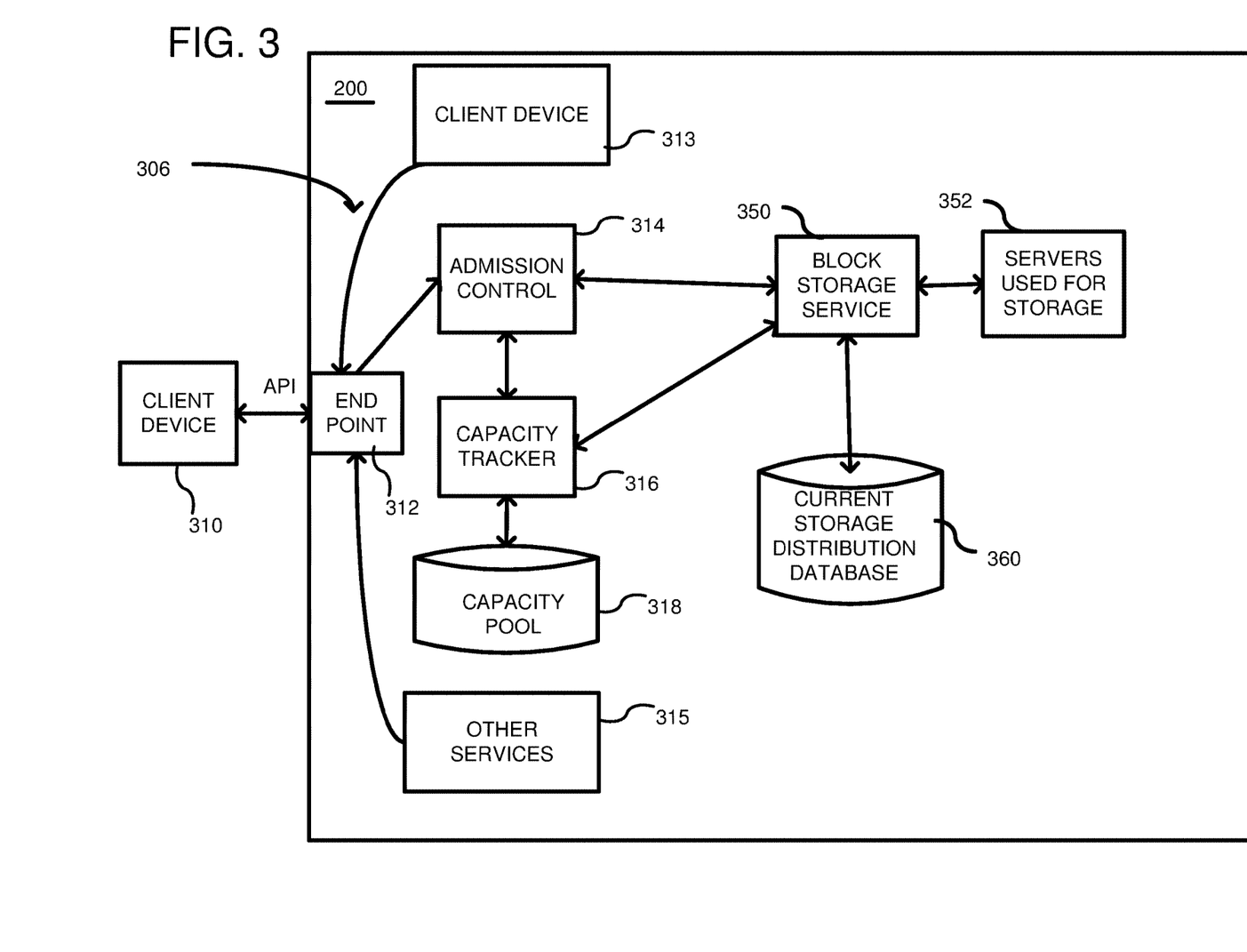
FIG. 3 shows further details of an example system including a plurality of management components associated with a control plane of the multi-tenant environment.

FIG. 3 illustrates in further detail management components 306 that can be used in the multi-tenant environment of the compute service provider 200. In order to access and utilize instances (such as instances 206 of FIG. 2), a client device 310 can be used. The client device 310 can be any of a variety of computing devices, mobile or otherwise including a cell phone, smartphone, handheld computer, Personal Digital Assistant (PDA), desktop computer, etc. The client device 310 can communicate with the compute service provider 200 through an end point 312, which can be a DNS address designed to receive and process API requests. In particular, the end point 312 can be a web server configured to expose an API. Using the API requests, a client 310 can make requests to implement any of the functionality described herein. Other services 315, which can be internal to the compute service provider 200, can likewise make API requests to the end point 312. Still further, virtual machines controlled by the client device and shown at 313 can also send requests through the end point 312.

Other general management services that may or may not be included in the compute service provider 200 include an admission control 314, e.g., one or more computers operating together as an admission control service. The admission control 314 can authenticate, validate and unpack the API requests for service or storage of data within the compute service provider 200. The capacity tracker 316 is responsible for determining how the servers need to be configured in order to meet the need for the different instance types by managing and configuring physical inventory in terms of forecasting, provisioning and real-time configuration and allocation of capacity. The capacity tracker 316 maintains a pool of available inventory in a capacity pool database 318. The capacity tracker 316 can also monitor capacity levels so as to know whether resources are readily available or limited. The capacity tracker 316 can also be used to track available space to store volumes within a block storage service 350. Thus, the block storage service 350 requests to the capacity tracker 316 what servers within the servers 352 are available to store volumes. The capacity tracker 316 can provide information regarding upon what servers the volumes can be stored. Thus, for a new request to store a volume, the block storage service 350 can only select a subset of the servers 352 due to availability constraints. Using this subset, the block storage service can use a placement algorithm having weights associated with predetermined metrics so as to decide where to store a new volume. For example, the block storage service 350 can request a database 360 that stores data associated with a current distribution of volumes. The database 360 can store data in a variety of formats. One example format is shown at 130 in FIG. 1. Based on metadata received with any request, the block storage service 350 can determine volumes having matching metadata (the logical association identifier) and servers where those volumes are stored. Such information can be used in a distribution algorithm that ensures volumes with matching metadata are well-spread between the servers 352. For example, the placement algorithm weighs heavily against a server having a volume with matching metadata as being the server to use for storing a new volume. An example algorithm can be as follows: Selected server=(W1)(S1)+(W2)(S2) . . . +(WN)(SN), wherein W is a weight, and S is an available server. Using such an algorithm, the weighting can be set to zero for servers that have associated volumes stored thereon and the weight increased for other servers. The resultant output can be a server suitability score providing one or more servers suitable for storage. In this way, associated volumes are evenly distributed within the servers 352. As another example, an average of partitions per server computer can be calculated for a given customer, a variance can be applied to the calculated average, such as a 10% deviation from the average, and if the selected server computer is below an amount equal to the average plus the variance, then the server can be selected, but if the server computer plus the variance is above that amount then the server computer is blocked from selection for that customer.

Figure 4:
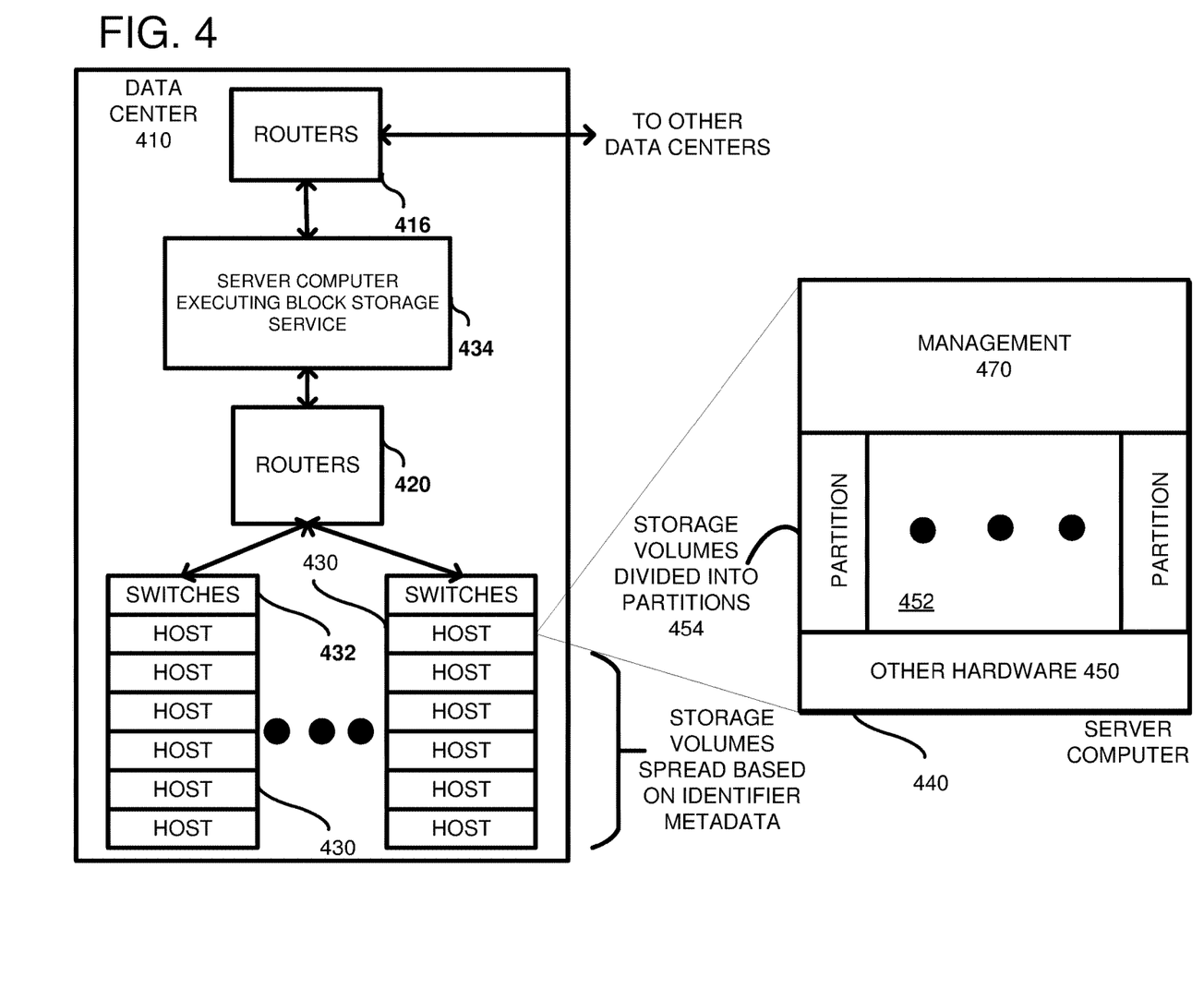
FIG. 4 shows an example of a plurality of host computers, routers and switches, which are hardware assets used for storing volumes within a data center.

FIG. 4 illustrates a data center 410 and the physical hardware associated therewith. The data center 410 can be coupled to other data centers via routers 416. Internal routers 420 within the data center 410 can route network traffic to one or more racks of host server computers 430. Each rack 430 can include a switch 432 coupled to multiple host server computers. A particular host server computer is shown in an expanded view at 440. The host server computers 430 are generally used by a block storage service hosted upon one or more server computers 434 so as to store volumes of data associated with the block storage service.

Each host 440 has underlying hardware 450 including one or more CPUs, memory, etc. The hardware also includes one or more storage devices, shown as layer 452, such as hard drive, solid state drive, etc. that can be used to store volumes. The block storage service can use storage device 452 to store partitions 454 so that portions of volumes can be separately stored. Using the partitioned storage device 452, multiple volumes or portions of volumes can be separately stored on the server computer. Thus, a volume can be stored across multiple server computers and when spreading volumes that have a same logical association identifier, the block storage service can choose not to use a server that has even one partition from a volume with a matching logical association identifier. The dispersion of volumes can therefore be on a partition basis.

Running a layer above the hardware 450, 452 is a hypervisor or operating system. The hypervisor layer can be classified as a type 1 or type 2 hypervisor. A type 1 hypervisor runs directly on the host hardware 450 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 470 can be part of the hypervisor, separated therefrom, or a program that runs on an operating system and generally includes instructions for allocating storage for partitions, handling I/O requests, monitoring, metrics gathering, etc.

Figure 5:
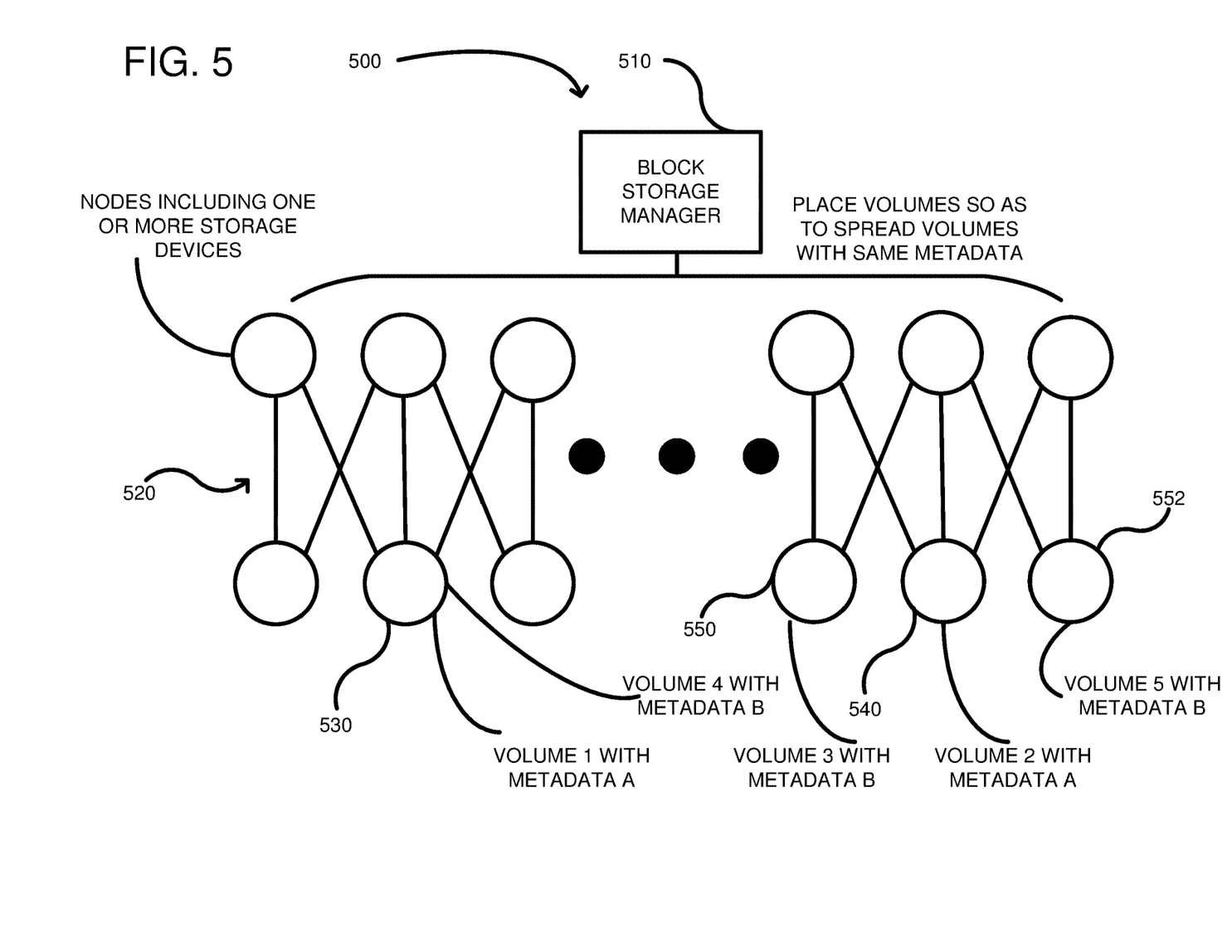
FIG. 5 shows a system diagram wherein the block storage service is coupled to a network of nodes representing one or more storage devices per node.

FIG. 5 is an example block storage service 500 including a block storage manager 510 and a plurality of nodes 520, which include one or more server computers. The nodes 520 can be storing data for a Hadoop cluster or other type of distributed computing environment. Such networks typically contain a large number of nodes, such as hundreds or even thousands of nodes. For purposes of illustrating how volumes having a same logical association identifier are spread across the nodes, multiple volumes are shown with two different logical association identifiers. The logical association identifiers are illustrated as metadata A and metadata B. A volume 1 having metadata A is stored on node 530. When a second volume, volume 2, is stored by the block storage manager 510, it recognizes that volume 1 is related in that it has the same metadata as a logical association identifier. Consequently, volume 2 is stored on a different node as is shown at 540. The block storage manager 510 can further ensure that partitions associated with volume 1 are stored on different server computers than partitions associated with volume 2. Thus, the spreading of volumes can be implemented in some embodiments as a spreading of partitions that make up the volumes. Volumes 3, 4, and 5 are shown having a same logical association identifier, metadata B. The block storage manager 510 also spreads or diversifies the volumes 3, 4 and 5 onto different nodes 550, 530, and 552, respectively. It should be noted that volume 1 and volume 4 both share storage on node 530, but because each has a different logical association identifier, the block storage manager 510 purposely stores the volumes on the same node so as to fully utilize the nodes.

Figure 6:
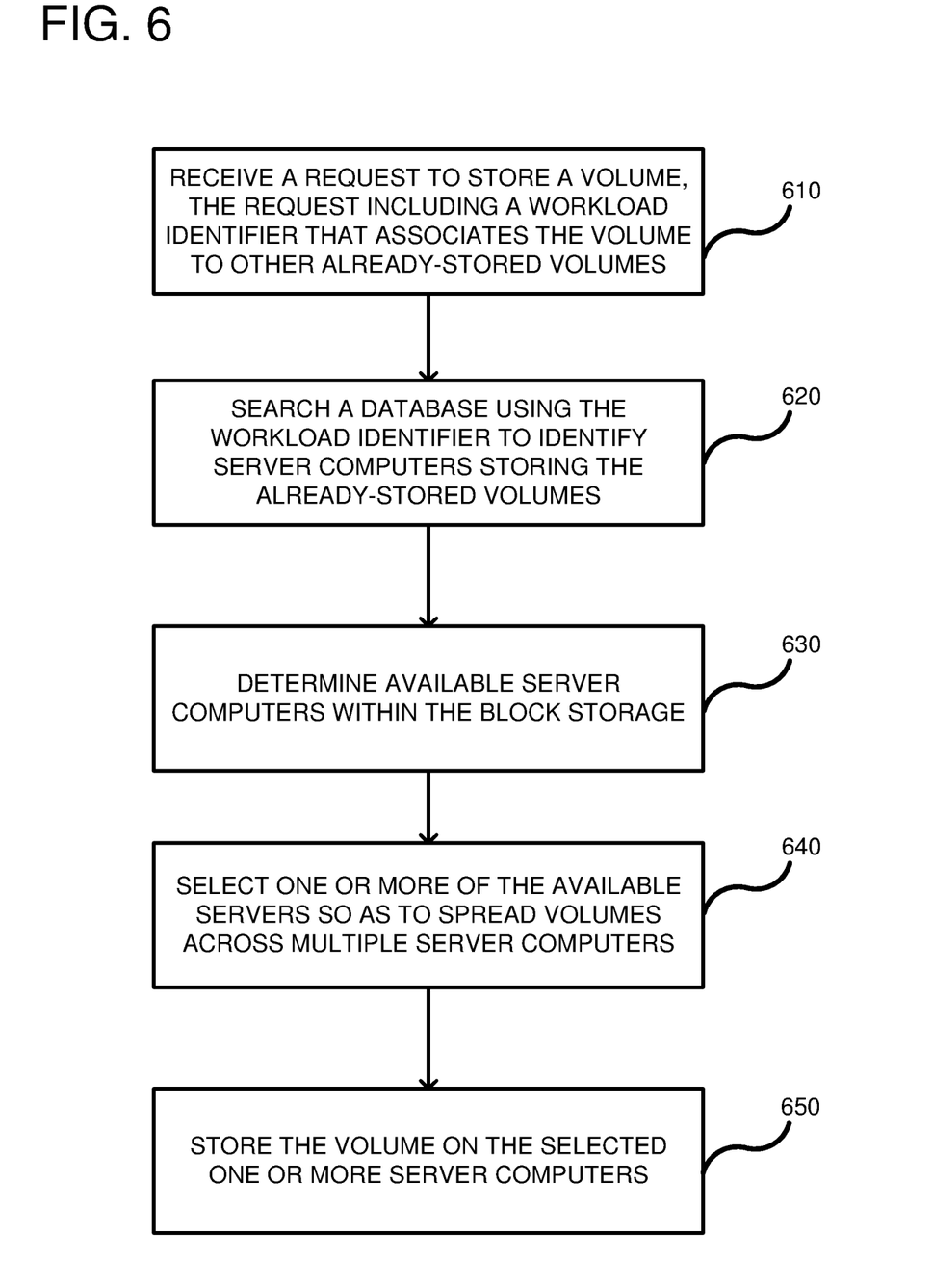
FIG. 6 is a flowchart according to one embodiment for storing volumes within the block storage service using a workload identifier in determining volume placement.

FIG. 6 is a flowchart according to an embodiment for storing volumes of data in a block storage service. At process block 610, a request is received to store a volume wherein the request includes a workload identifier that associates the volume to other already stored volumes. In this case, the workload identifier is the logical association identifier that can be a GUID or other alphanumeric identifier. The workload identifier indicates that the volumes are associated with a same database, application, or other common workload types. In process block 620, a database is searched using the workload identifier to identify server computers storing the already stored volumes. For example, turning to FIG. 1, the database to be searched can include the distribution table 130 having multiple table entries, each of which is associated with one workload identifier. Once a table entry is matched, server computers storing volumes having a same workload identifier can be obtained. For example, the fields in the table entries can include network addresses of the associated server computers. The associated server computers have volumes or partitions with a matching logical association identifier. In process block 630, the block storage service further obtains available server computers for which the new volume can be stored. For example, in FIG. 3, the block storage service 350 can query the capacity tracker 316 for which servers 352 are available for storage as indicated in the capacity pool 318. In process block 640, the block storage service selects one or more of the available server computers so as to spread the volumes across multiple server computers when the volumes have a same workload identifier. The spreading of the volumes can entail ensuring that partitions associated with the volumes are sufficiently spread across multiple server computers. In this way, maximum accessibility to the volumes will be obtained because workloads typically require bursts of data for all volumes associated with the workload. Thus, the block storage manager stores the new volume on a different server computer than other volumes having a matching logical association identifier. In process block 650, the volume associated with the request is stored on the selected one or more server computers.

Figure 7:
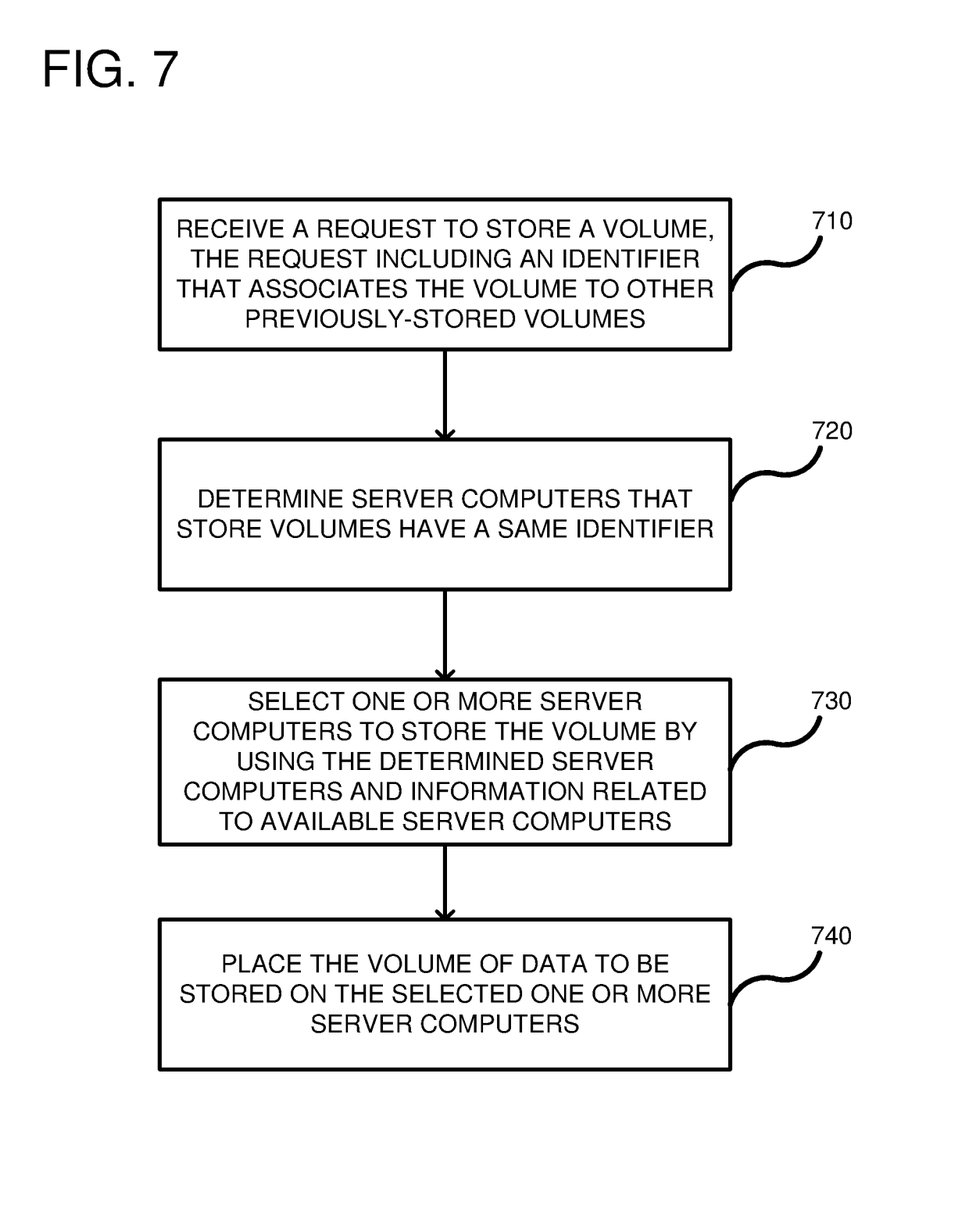
FIG. 7 is a flowchart according to another embodiment for storing volumes in response to a request including an identifier that associates the volume to other previously-stored volumes.

FIG. 7 is a flowchart according to another embodiment for storing volumes of data using a storage service. In process block 710, a request is received to store a volume wherein the request includes an identifier that associates the volume to other previously stored volumes. As previously described, the identifier can be a workload identifier or other identifier that links the volumes so as to have a common association. In process block 720, server computers are determined that store volumes having the same identifier. Thus, volumes stored by the storage service having the same identifier as the volume in the request should be dispersed within the storage service so that they are stored on separate server computers. In process block 730, one or more server computers are selected to store the volume by using the determined server computers and information related to available server computers. In particular, the determined server computers are server computers that should be avoided for storing the new volume. Thus, for example, the available server computers can be considered a list of server computers and the determined server computers are deleted from that list providing server computers that remain as candidate server computers for storage. Furthermore, the list can be further reduced using geographical restrictions such as by ensuring all related volumes are within a same data center or similar geographic location. By having volumes within the same data center, the accessed times for the volumes will be similar so as to reduce unwanted latency. In process block 740, the volume of data is placed on the selected one or more server computers.

After storing the volume of data on the selected server computers, the selected server computers can be added as an entry within a database so as to associate the selected server computer with the identifier. For example, returning to FIG. 1, the server can be added to the appropriate entry within the distribution table 130. In order to select the one or more server computers, the storage service can use a placement algorithm which generates a server suitability score based on the determined server computers and information related to the available server computers. An algorithm associated with the server suitability score can have various weightings associated with the server computers wherein the weightings can relate to geographic location as well as whether a server computer has the same identifier. The weightings are designed so as to ensure ample spread of the volumes having the same identifier across different server computers. The spreading of the volumes, in some embodiments, relate to ensure ample spread of partitions associated with the volumes.

The identifier can take a variety of forms such as being a workload identifier or a target customer identifier. One example workload identifier is where each volume associated with the workload is from a same relational database. The target customer identifier is not an identifier of the customer directly making the request to the block storage service, but rather a customer of the requestor. Thus, such a request to the block storage service would include a customer identifier, the volume to be stored, and a target customer identifier operating as metadata that links multiple volumes together.

After the volumes have been stored, the storage service can at any point use the identifier, which is the logical association identifier, to reorganize the volumes and ensure that the volumes are sufficiently spread across server computers under control of the storage service. For example the storage service can analyze a spread of volumes associated with the same identifier to calculate a spread metric indicating how volumes are stored across the server computers. In one example, volumes having the same identifier that are located on a same server computer can increase the value of the metric. Likewise, volume stored on different server computers and having the same identifier can reduce the metric. If the metric exceeds a predetermined threshold, the volumes can be reorganized so as to distribute the volumes and reduce the value of the metric below a predetermined threshold.

Figure 8:
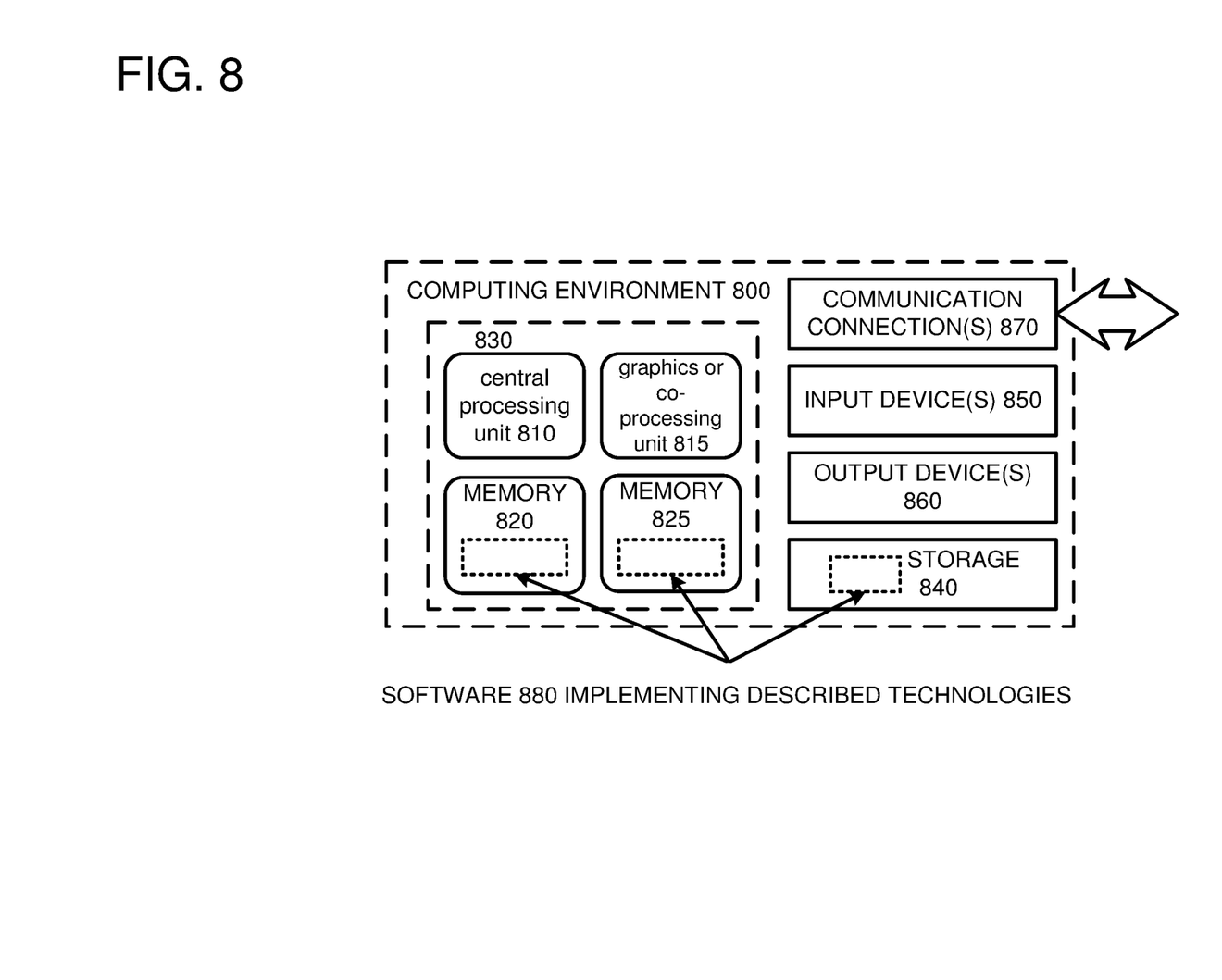
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.). The computing environment 800 can be used for executing the storage service or for acting as a storage node for storing volumes.

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computer-implemented method, comprising:
   in a block storage service, receiving a request to store a volume of data, wherein the request includes a workload identifier as a parameter that associates the volume of data to be stored to other volumes already stored by the block storage service, wherein which workload identifier is included in the request is chosen by a requestor making the request;
   by the block storage service, searching a database using the workload identifier to find an entry having a matching workload identifier, wherein the entry includes information identifying one or more server computers having the already-stored volumes with the same workload identifier;
   determining available server computers within the block storage service on which to store the volume of data;
   selecting one or more of the available server computers using the information identifying the one or more server computers having the same workload identifier, wherein the selecting of the one or more server computers is accomplished using a placement algorithm that places the volume of data to be stored so as to spread volumes having the same workload identifier across multiple server computers within the block storage service, wherein the placement algorithm weighs the selection so that the volume is not stored on a same server computer as other volumes having the same workload identifier;
   storing the volume on the selected one or more server computers; and
   reading a plurality of the volumes having the same workload identifier in parallel from the multiple server computers in response to a read request.

2. The computer-implemented method of claim 1, further including adding the selected one or more server computers to the entry within the database so as to associate the selected server computer with the workload identifier.

3. The computer-implemented method of claim 1, wherein the requestor is a service within a compute service provider or a target customer of the service.

4. The computer-implemented method of claim 3, wherein the request includes the customer identifier and the workload identifier is an identifier associated with the target customer so that volumes associated with the target customer are spread across the multiple server computers.

5. The computer-implemented method of claim 1, wherein the placement algorithm chooses the selected server computer so as to maximize performance characteristics of the volume of data.

6. The computer-implemented method of claim 1, wherein the associated volumes are portions of a same relational database.

7. The computer-implemented method of claim 1, wherein the volume of data and the already stored volumes include multiple partitions and wherein the placement algorithm analyzes partition placement when spreading the volume of data to be stored in relation to the already stored volumes across multiple server computers.

8. One or more non-transitory computer-readable storage media, which is non-volatile, comprising instructions that upon execution by one or more processors cause a computer system to:
   receive a request, in a storage service, to store a volume of data, the request including an identifier, chosen by the requestor, wherein the identifier associates the volume of data to be stored with other volumes of data previously stored by the storage service;
   determine server computers within the storage service that store volumes having a same identifier as the volume of data to be stored;
   select one or more server computers to store the volume of data by using the determined server computers and information related to available server computers, wherein the selection ensures that the volume of data is placed on a different server computer than the determined server computers; and
   place the volume of data to be stored on the selected one or more server computers; and
   read in parallel, the volume of data and at least one of the stored volumes having the same identifier.

9. The computer-readable storage medium according to claim 8, wherein the selecting of the one or more server computers includes instructions that, upon execution, further cause the computer system to:
   generate a server suitability score based on the determined server computers and the information related to the available server computers, wherein the server suitability score is based on ensuring ample spread of the volumes having the same identifier across different server computers.

10. The computer-readable storage medium according to claim 9, wherein the identifier is a workload identifier and wherein the volume of data to be stored and the previously stored volumes relate to a same workload.

11. The computer-readable storage medium according to claim 10, wherein the workload identifier indicates that each volume is associated with a same relational database.

12. The computer-readable storage medium according to claim 8, wherein the storage service is a service within a compute service provider and wherein the requestor is also a service within the compute service provider.

13. The computer-implemented method of claim 12, wherein the identifier is a target customer identifier associated with a customer of the requestor so that the storage service receives an identifier of the customer of the requestor and an identifier of the requestor itself.

14. The computer-implemented method of claim 8, wherein the volume of data and the previously stored volumes include multiple partitions and wherein placing the volume includes analyzing partition placement when spreading the volume of data to be stored in relation to the already stored volumes across multiple server computers.

15. The computer-implemented method of claim 8, includes instructions that, upon execution, further cause the computer system to:
   analyze a spread of volumes associated with the same identifier to calculate a spread metric indicating how volumes are stored across server computers; and
   reorganize the volumes associated with the same identifier if the spread metric is above a predetermined threshold.

16. A compute service provider, comprising:
   a plurality of server computers available for executing virtual machines by target customers of the compute service provider;
   a plurality of server computers within the compute service provider for executing services available to the target customers of the compute service provider; and
   at least one of the plurality of server computers for executing a block storage service used to store volumes using one or more processors, the block storage service configured to:
      receive a request to store a volume, wherein the request includes an identifier as a parameter of the request, wherein the identifier associates other volumes already stored within the block storage service with the volume to be stored so that volumes associated with the same identifier are distributed across multiple server computers within the block storage service and the volume is not stored on a same server computer as the other volumes having the same identifier already stored within the block storage service.

17. The content service provider of claim 16, wherein the identifier is a parameter changeable by a requestor associated with the request and not a customer identifier of the requestor.

18. The content service provider of claim 16, wherein the block storage service is configured to redistribute stored volumes based on the identifier.

19. The content service provider of claim 16, wherein the identifier identifies a database associated with the volumes or identifies a load balancer.

20. The content service provider of claim 16, wherein the workload identifier is associated with a customer of the requestor.

* * * * *